Figure 2:
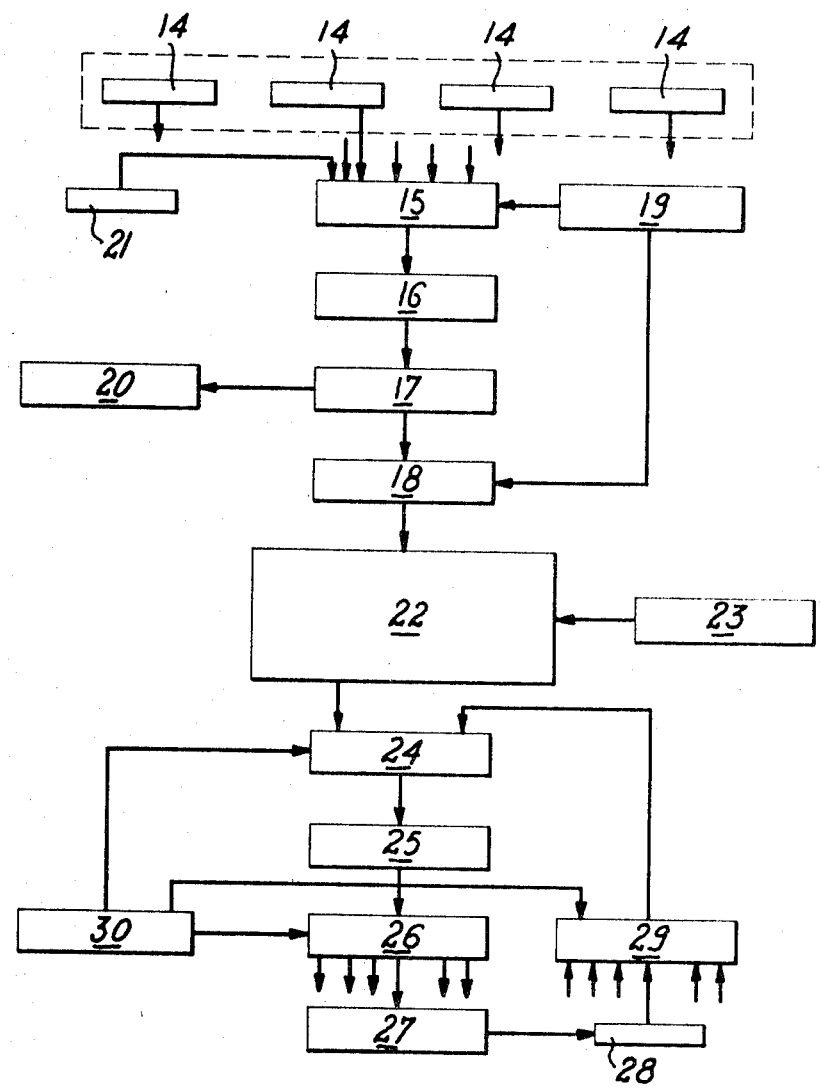

United States Patent

[11] 3,590,465

| [72] | Inventors | Andre Cartier<br>Verrieres-le-Buisson;<br>Phillippe Guillet, Franconville; Daniel<br>Godin, Fontenay-aux-Roses, all of, France |
|---|---|---|
| [21] | Appl. No. | 736,943 |
| [22] | Filed | June 11, 1968 |
| [45] | Patented | July 6, 1971 |
| [73] | Assignee | Commissariat A L'Energe Atomique<br>Paris, France |
| [32] | Priority | June 5, 1967 |
| [33] | | France |
| [31] | | 109162 |

[54] METHOD AND APPARATUS FOR READJUSTING THE RELATIVE POSITION OF A GROUP OF MEMBERS INDIVIDUALLY CONNECTED TO THE EARTH
11 Claims, 4 Drawing Figs.

[52] U.S. Cl. .................................................. 29/434,
29/200, 29/208, 29/400, 29/407
[51] Int. Cl. ........................................... B23p19/00,
B23p 19/04, B23q 17/00
[50] Field of Search .......................................... 29/434,
200, 400, 208, 208 C, 200 P, 407

[56] References Cited
UNITED STATES PATENTS
3,195,411   7/1965   MacDonald et al. .........   29/407 X Primary Examiner—Thomas H. Eager
Attorney—Craig, Antonelli, Stewart & Hill ABSTRACT: Method for readjusting the relative position of a group of members individually connected to the earth according to a given diagram, consisting, while the group of members are interconnected for constituting an isostatic system, in determining the changes in the coordinates of each member according to the remaining degrees of clearance, in calculating the displacements to be effected according said degrees of clearance for bringing back said members in a diagram identical to said given diagram, and in achieving said displacements with the aid of mechanisms allowing movements according any one of the degrees of clearance.
Device according to the working process.

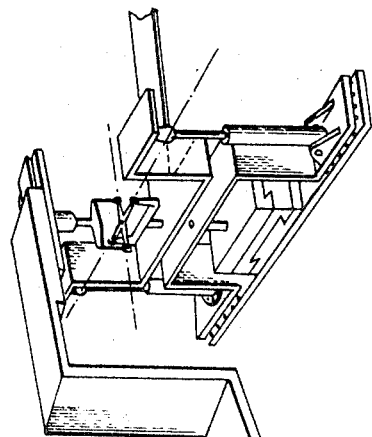
FIG.1
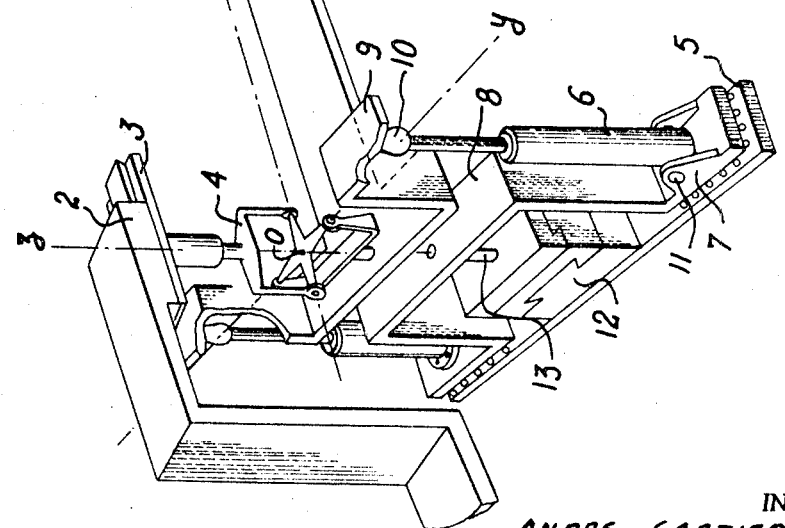

FIG.3
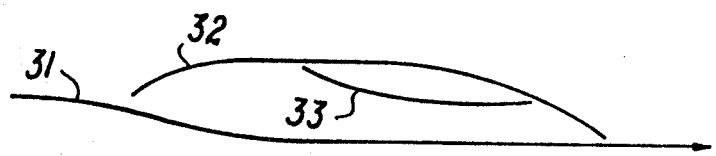
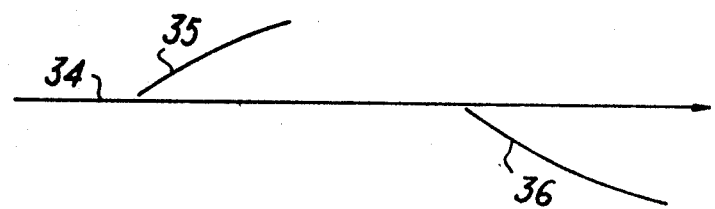
FIG.4

METHOD AND APPARATUS FOR READJUSTING THE RELATIVE POSITION OF A GROUP OF MEMBERS INDIVIDUALLY CONNECTED TO THE EARTH

The present invention relates to a method for readjusting the relative position of a group of members individually connected to the earth according to a given diagram. The present invention relates also to a device carrying out said method for aligning the magnets of a circular particle accelerator.

Some scientific or industrial equipment entails a very high accuracy in the relative position of the constituent apparatus. In these conditions, if said equipment is too important in number, too heavy or too dispersed for being fixed on a single rigid frame, the problem is to hold in time the initial arrangement in spite of the deformations of the subjacent earth.

In general, use is made of special foundations whose the displacements are corrected with the aid of manually controlled jacks. Such a solution sometimes proves to be expensive, inefficacious, and even impracticable, according to the nature of the earth.

The present invention proposes another solution that does not depend on the properties of the earth. The apparatus constituting the equipment being supported in position and previously adjusted in such a manner that their relative arrangement is regarded as acceptable, after a certain time, the accuracy of said relative arrangement happens to be modified by the differential movements of the earth. The method according to the present invention allows the bringing back of the group of apparatus to their initial relative position, periodically or at will, when the changes in the accuracy is regarded as unacceptable. Said return motion can be achieved without stopping the equipment and, if necessary, without entailing an intervention on the spot.

More definitely, the present invention relates to a method for readjusting the relative position of a group of members individually connected to the earth according to a given diagram and said method being characterized in that it consists, while the group of said members are interconnected for constituting an isostatic system and each member is provided with shift detectors for the remaining degrees of clearance, in determining, after the displacement of the members constituting a deformed diagram, the changes in the coordinates of each member according to said degrees of clearance with respect to a trihedron in connection with the preceding or the following member, in calculating the displacements to be controlled according to the remaining degrees of clearance for bringing back said members in a diagram identical to said given diagram, representing another arrangement with respect to the earth on occasion and corresponding, for instance, to a minimum displacement with respect to said deformed diagram, and in achieving said displacements with the aid of mechanisms allowing movements according to any one of the degrees of clearance.

The present invention relates also to a device for carrying out said method in the case of the alignment of the magnets of a circular particle accelerator, said device being characterized in that it comprises, connected to the frame of each magnet:

a mechanism for the isostatic connection to the adjacent frame, suppressing the possibility of a relative displacement towards the center of the orbit and in a vertical plane and separating completely the relative displacements in the direction of the tangent to the orbit and the changes in the orientation around the radius of the orbit, around the tangent to said orbit and around a third direction, said three directions delimiting a direct and orthogonal trihedron, a supporting and displacing mechanism controlling the displacements, with respect to the earth, of the connecting point in the direction of the three axis of the trihedron and the rotation of the frame around the tangent to the orbit, an equipment for measuring the displacements of the frame for each of the four movements separated by the connecting mechanism, an equipment for the automatic calculation of the displacements to impart to the frame in accordance with said movements for restoring the alignment, and a mechanism for controlling said displacements through a given value.

The invention will be now described by way of an illustrative but nonlimitative example with reference to the accompanying drawings in which:

the FIG. 1 is a perspective view of the device according to the invention, the FIG. 2 shows schematically the equipment used for the calculation of the displacements to be controlled and for the control of the motors controlling said displacements, the FIG. 3 is relative to the use of the method according to the invention in the case of equipments comprising several channels, at last, the FIG. 4 is relative to the use of the method according to the invention in the case of equipment comprising diverting channels.

Let N be the number of constituent members of an equipment so that each member can be regarded as a nondeformable solid characterized by any corresponding system of coordinates: for instance, a system of Cartesian and orthogonal coordinates $o_i\ x_i\ y_i\ z_i$, $i$ being the serial number of an in-point member counted along a continuous line passing through all the members. If the system of the equipment is monolinear, which is often the case, said line follows the scheme of the system.

Suppose there are two successive members $i$ and $i+1$. The position of $i+1$ with respect to $i$ is defined by the knowledge of six values corresponding to the 6° of clearance between two independent solids. In the in-point case of systems of Cartesian and orthogonal coordinates, the position of the system $i+1$ with respect to the system $i$ is for instance defined by: $x_{(i+1)}, y_{(i+1)}, z_{(i+1)}$ (coordinates of $O_{i+1}$ in the system $i$) and $\alpha_{(i+1)}, \beta_{(i+1)}, \gamma_{(i+1)}$ (rotations around $x_i, y_i, z_i$ that should bring the system $i+1$ in parallel with the system $i$).

Equipment which allows the measurement of the variations of said six values is therefore necessary between two successive members. In reality, the variations of said values are not always measurable and the variations of six other values can be measured. However, the latter cannot be indiscriminately chosen for their knowledge must allow to calculate unambiguously the variations of $x_{(i+1)}, y_{(i+1)}, z_{(i+1)}, \alpha_{(i+1)}, \beta_{(i+1)}, \gamma_{(i+1)}$.

Therefore, the measuring equipments have to be supported by mechanisms allowing the ones to be separated from the others the values whose the variations have to be measured.

However, in the majority of cases, it is not necessary to expect a system with 6° of clearance. Now the suppression of 1° of clearance is interesting for the main following reasons:

one measure is suppressed and therefore the corresponding equipment.

if the suppressed degree of clearance is conveniently chosen, the sensitiveness to the deformations of the earth is reduced, for the equipment in operation, which conduces to an enlargement of the tolerances.

the repositioning operations are simplified.

The suppression of degrees of clearance between two successive members can be obtained only by connecting said members by means of an appropriate connecting mechanism, the group of said members having therefore to constitute a continuous system. Said system is imperatively an isostatic system. As a matter of fact, in a hyperstatic system, the displacements of the supports should conduce to stresses and internal deformations in each member. The measures should become not exploitable and the repositioning operations should be very problematical and even impossible.

Said isostatism condition defines the degrees of clearance to be kept for a given case. As the latter can be created separately in the connecting mechanism, said mechanism will be the simplest support for the measuring equipment.

The so-constituted continuous system must be then resting on the earth by means of mechanisms allowing the successive repositioning operations. Such a mechanism may be advantageously composed of jacks so disposed that each of the degrees of clearance can be modified and each of said jacks can be regarded as a "displacement vector."

In addition, the relative arrangement of the constituent members of the equipment must be kept while respecting a number of conditions at the limits at each of the extremities of the equipment. If, for instance, the members are disposed on a closed curve (which is the case for a circular particle accelerator) it is the closing condition that constitutes the conditions at the limits.

In said case, the principle of use of the method according to the invention is as it follows: just after the initial adjustment, the indications of the measuring equipments are recorded or reset to zero. In this condition, the whole system makes a diagram $F_o$ that is the theoretical diagram by definition. But, after a certain time, in consequence of the deformations of the earth, the diagram changes into $F_1$. An impossibility should result if the displacing mechanisms were then acted upon for bringing back to their initial value the indications of the successive measuring equipment. As a matter of fact, the unavoidable instrumental errors being taken into consideration, the conditions at the limits should be not respected. It is therefore necessary, prior to any action on the displacing mechanisms, to record all the new indications given by the measuring equipment and, occasionally with the aid of a programmer of automatic calculations, to correct them in order to answer the conditions at the limits. Said group of corrected values allows to know at the real diagram $F_1$. The programmer of automatic calculations must at last determine the displacements to be controlled for each displacement vector, for bringing the diagram back to its shape $F_o$, by comparing said corrected values with the initial values. The displacing mechanisms must be therefore capable of controlling a displacement through a given value.

It must be noted that all the measures, which are made, are relative measures that allow only knowledge of the shape of the diagram, without determining its position in space. It is therefore necessary to introduce in the programmer of automatic calculations an additional condition allowing prevention of a drift of the whole equipment. That can be made in several ways and the choice must be adapted to the working conditions of the equipment. In addition, since the measures are inevitably erroneous, the repositioned diagram will be a diagram $E_2$ whose differences with the diagram $F_o$ will be the results of the errors made, in the measures, with respect to $F_o$. Such a remark can be made for all the diagrams obtained after the repositioning operations, and therefore said diagrams will be kept centered on $F_o$, on an average. Therefore, there will not be either a drift in the shape of the diagram providing naturally the initial adjustment of the measuring equipments is not altered. At last, the reference diagram being always the initial reference diagram $F_0$, the deformations of the earth have not a cumulative effect on the measuring equipment. On the contrary, the displacing mechanisms have to be predetermined in function of the possible total deformations.

The method is used in a manner identical to the one corresponding to the case of a closed curve, in the case the members constituting the equipment are disposed on a nonclosed curve while respecting, in addition, conditions at the limits at each of the extremities.

On the contrary, in the case the members of the equipment are disposed on a nonclosed curve, without conditions at the limits, one of the members constituting the reference mark, the method is used in a quite simplified manner. As a matter of fact, since all the members must have a well-defined position with respect to the reference member, whatever be its absolute displacements without particular conditions at the limits, it is therefore sufficient to reposition each of the members located on each side of the reference member till the indications of the corresponding apparatus are reduced to zero, and so on. In said case, the indications of the measuring equipments are directly exploitable and it is not necessary to use a programmer of calculations.

The device carrying out said method, which will be now described, applies to the alignment of a circular particle accelerator such as a synchrotron. In such an equipment, the magnets, by 350 m. effect of their magnetic field on the particles, keep the latter on the desired path, with a certain accuracy, during the whole cycle of acceleration.

If the cyclical character of the phenomena (each particle passes a great number of times through the field of the same magnet) is taken into consideration, if the fact that the particles are vibrating around a middling path is also taken into consideration, at last if the resonance effects are taken into consideration, the accuracy to be reached is closely dependent on the periodicity exhibited by the errors in the alignment all around the accelerator. In addition, an error in the alignment of a magnet is less a serious matter if it does not conduce to a discontinuity in the general arrangement of the diagram. It is therefore desirable that the diagram, after the alignment, should be as "smooth" as possible.

By way of example, the synchrotron, for which the device described hereunder is intended, comprises 208 magnets to be aligned along a practically circular curve having a diameter of about 350 m.

In the FIG. 1, the frame of each magnet is represented at 1. It has practically the shape of a T whose extremities of the three legs are disposed in the same plane, at a level higher than the one of the central part and parallel to said part. A system of axis $0xyz$ is associated to each frame; O is the connecting point of said frame to the adjacent frame, $0x$ is parallel to the tangent to the orbit at the point O, $0y$ is directed to the center of the orbit and $0z$ makes up the direct trihedron.

Each frame 1 comprises a mechanism for its connection to the adjacent frame and a supporting and displacing mechanism.

The mechanism for the connection of the frame $i$ to the frame $i$-1 is made of a dovetailing whose female member 2 is constituted by the extremity of the main beam of the frame $i$-1 and whose male member is constituted by a plate 3. Said dovetailing forms a slider suppressing the possibility of a relative displacement in the directions $y$ and $z$ while allowing only the relative displacements in the direction $x$. The male member 3 of the dovetailing is connected to the frame $i$ at the intersection of the three legs of the T by means of a swivel made of an universal joint 4 allowing the relative rotations around $x$, $y$ and $z$ and transferring the charge of the frame $i$-1 to the frame $i$. It is easy to establish that the center of the coupling member of the universal joint 4 constitutes the connecting point O of the frame $i$ to the frame $i$-1.

Said connecting mechanism is isostatic and allows all the relative movements of the earth and, on occasion, the thermal expansions of the frames.

The supporting and displacing mechanism of each frame is located under its connecting mechanism. The frame $i$ is resting on a stand 5 through two jacks 6 independently controlled disposed in the plane $0y 0z$ on each side of the connecting point O and at the same distance from the latter. Said jacks are themselves resting on two ball-plates 7 interconnected through a member 8. The jacks 6 are connected to the extremities 9 of the frame by means of swivel-connections 10, the center of the swivels and the connecting point O being strictly aligned in the direction $0y$. The jacks are connected to the ball-plates by means of hinge joints such as 11 allowing a rotation around the axis $0x$.

Said jacks allow, with respect to the earth, the displacements of the connecting mechanism in the direction $z$ (the two jacks are simultaneously controlled) and the rotations of the frame $i$ around $x$ (the two jacks are controlled in opposition). For the frame $i$ and with respect to the frame $i$-1, said operations conduce to a rotation around $y$ and to a rotation around $x$, respectively.

Between the two jacks and straight below the center O of the swivel 4 is located a cross-motion bed 12 constituted by two crossed and superposed dovetailings. A vertical rod 13 connects said bed to the swivel 4; it can slide freely in said bed and can rotate in it around its axis.

Such an arrangement allows displacement of, with respect to the earth, the connecting point O in the direction of $x$ and $y$, which corresponds to a displacement in the direction $x$ and to a rotation around $z$, respectively, for the frame $i$ with respect to the frame $i-1$.

The various displacing members (jacks 6 and the cross-motion bed 12) are equipped with motors, not shown in the FIG 1, for allowing them to be remotely controlled in order to achieve the necessary corrections for the alignment. The motors are capable of controlling the displacements through a given value.

The described mechanisms separate completely four relative movements: the translation in the direction $x$ (movement of the bed 12 in the direction $x$), the rotation around $z$ (movement of the bed 12 in the direction $y$), the rotation around $x$ (jacks 6 controlled in opposition) and the rotation around $y$ (jacks 6 simultaneously controlled). The displacements according to each of these four movements can be easily converted in order to be treated as linear displacements that can be measured by means of differential inductive detectors (the detectors are not shown in the FIG. 1). Consequently each frame comprises four detectors.

The FIG. 2 shows schematically the equipment used for the calculation of the displacements to be controlled according to each of these four movements, and for the control of the motors controlling said displacements.

The four detectors associated to each of the connections are shown at 14. In the case of the synchrotron with 208 magnets, there are consequently 832 detectors. The one economical and possible solution is to reduce at a minimum, say to only the detectors, the proper equipment of each measuring point and to make a cyclical changeover of said detectors on a single measuring chain. The switching device used to this end is shown at 15.

The data collected by the detectors are first amplified in 16, then coded in 17 and brought together in a memory 18 (punched cards, punched tape, magnetic tape) said "measure memory." A circuit 19 ensures the cyclical control of said operations while an optical indicating system 20 allows at any time the direct reading of the indications supplied by the detectors for the operator.

A reference detector 21, located within a tight and heat-insulated vessel, allows correction of the occasional shifts of the electronic circuits due in particular to its "ageing" and to the variations of the external temperature.

The data are then introduced into a computer 22 whose the programmer 23 controls the following operations:

1. analysis of the measures for expressing the closing condition.
2. correction of said measures for answering said condition.
3. comparison of the corrected measures with the ones of the initial diagram $F_o$, the additional condition intended for preventing a shift of the whole equipment being taken into account.
4. determination of the displacement vectors that allow putting of $F_1$ into coincidence with $F_o$.

The results of the calculations appearing in the form of a group of coded signals in a circuit 24, said "displacement memory," it is necessary to translate them clearly by means of a circuit 25. Then, a selector 26 sends successively, to each of the 332 motors 27, the orders relative to the movements that said motors must transmit to the jacks 6 and to the cross-motion beds 12.

A counter 28, associated with a selector 29, tests that the orders have been correctly controlled by the motors. Said cycle of tests in controlled by a circuit 30.

Various solutions can be expected for achieving the correcting displacements. Three of said solutions are given hereunder by way of example.

1. The 832 motors are operated simultaneously. During said step of operation, which has a relatively duration, the diagram $F_1$ is converted into $F_o$ while keeping its continuous and "-smooth" character. Said operation can therefore be made without stopping the synchrotron.

2. The 832 motors are operated by successive selections. In said case, during said operating step, the diagram inevitably presents discontinuities that may be incompatible with the operation of the synchrotron.

3. The 832 motors are controlled step by step by cycles of successive selections. Said solution, as the first one, allows the operation of the synchrotron during the displacements.

The method described hereabove is based upon geometrical measures independent of the proper working of the in-point industrial or scientific equipment. Of course, in some cases, measures relating directly to the processes of the equipment can be used as reference for the realignment calculations. In the case of a circular synchrotron for instance, measures on the position of the beam with respect to the magnets can be used as date for the realignment calculations.

If a number of apparatus constituting the equipment have internal defects whose the effects can be corrected by displacing the corresponding apparatus, the method according to the invention can allow said corrections. For instance, in a circular synchrotron, the magnetic defects of the magnets and, in general, the defects whose the effects are constant during the acceleration cycle can be corrected with the proposed method.

At last, the FIGS. 3 and 4 are relative to the use of the method in the case of equipments whose the diagram is not monolinear.

If the diagram comprises for instance three ways (FIG. 3) the main line is the line going from one extremity to the other (line 31) and said line is realigned independently of the remaining equipment. The line 32 is then realigned while taking into account, as the conditions at the limits, the fact that the apparatus of the extremities, which are common to the lines 31 and 32, must not be displaced. At least, the line 33 is realigned while taking into account that the apparatus common to the lines 32 and 33 must not be displaced.

If the diagram (FIG. 4) comprises a main line 34 and diverting channels (lines 35 and 36), the problem may be considered as a particular case of the preceding one. The one difference lies in the fact that the conditions at the limits are free at one extremity: it may not have conditions at the limits said conditions may be proper to the working conditions of the equipment. Said case appears for instance for the beams extracted from a circular synchrotron. The ejecting magnet will be realigned with the main machine and the fact that the displacing jacks are not controlled again will constitute the conditions at the limits for one extremity.

It will be understood that the invention has been described by way of a nonlimitative example and that it can be modified within the scope of the appended claims.

What we claim is:

1. A method for readjusting the relative position of a group of members individually connected to the earth according to a given diagram consisting, while the group of members are interconnected for constituting an isostatic system and each member is provided with shift detectors for the remaining degrees of clearance, in determining, after the displacement of the members constituting a deformed diagram, the changes in the coordinates of each member according to said degrees of clearance with respect to a trihedron in connection with the preceding or the following member, in calculating the displacements to be effected according to the remaining degrees of clearance for bringing back said members in a diagram identical to said given diagram, representing another arrangement with respect to the earth on occasion and corresponding, for instance, to a minimum displacement with respect to said deformed diagram, and in achieving said displacements with the aid of mechanisms allowing movements according any one of the degrees of clearance.

2. A method according to claim 1 in which a trihedron connected to any one of said members is chosen as the reference trihedron.

3. A method according to claim 1 in which, if the method is used for readjusting the relative position of members disposed along a closed curve, the isostatic connections provided between said members allow, as degrees of clearance, only the displacements tangential to said curve and the changes in the orientation in the direction of the three axis of a right-angled trihedron.

4. A method according to claim 1, in which, if the method is used for readjusting the relative position of members disposed along a non-closed curve, the operations are identical to the ones corresponding to a closed curve while respecting, in addition, conditions at the limits at each of the extremities.

5. A method according to claim 1, in which the various operations for determining the undergone deformations, for calculating the displacements to be controlled and for controlling the readjusting mechanisms, are controlled with the aid of a programmer of automatic calculations.

6. A method according to claim 1, in which, if the method is used for readjusting the relative position of members disposed along a non-closed curve, without the necessity of respecting conditions at the limits at each of the extremities, each of the members located on each side of a member chosen as a reference member is merely repositioned till the indications of the corresponding measuring equipments are reduced to zero, and so on.

7. A device for carrying out the method according to claim 3, for aligning the magnets of a circular particle accelerator of nuclear particles, comprising on the one hand, connected to the frame of each magnet;

- a mechanism for the isostatic connection to the adjacent frame, suppressing the possibility of relative displacement of the frames toward the center of the orbit of the particles, and in a vertical plane and separating completely the relative displacements in the direction of the tangent to the orbit as well as the changes in the orientation around the radius of the orbit, around the tangent to said orbit and around a third direction, said three directions delimiting a direct and orthogonal trihedron,
- a supporting and displacing mechanism controlling the displacements of the frame with respect to the earth of the connecting point with said adjacent frame in the direction of the three axes of the trihedron and the rotation of the frame around the tangent to the orbit of the particles,
- means for measuring the displacements of the frame for each of the four movements separated by the connecting mechanism,
- and a mechanism for allowing the displacements of the frame to be carried out in conformity with said movements and, on the other hand, a unit of automatic calculation on the basis of the indications furnished by the measuring means, wherein displacements are to be undergone by each frame so as to reestablish alignment and said unit controlling said displacing mechanism.

8. A device according to claim 7 in which the connecting mechanism comprises a slider and a swivel made of an universal joint.

9. A device according to claim 7 in which the supporting and displacing mechanism comprises two independently controlled jacks disposed on each side of the connecting point in the direction of the radius of the orbit, two ball-plates resting on the earth and supporting said jacks, and a cross-motion bed fastened to the earth and disposed between the jacks straight below the connecting point.

10. A device according to claim 7 in which the equipment for measuring the deformations, which is associated to each frame, comprises four differential inductive detectors.

11. A device according to claim 7, in which the mechanism controlling said displacements comprises four motors capable of rotating through a given number of turns.